United States Patent
Ozawa

(10) Patent No.: US 6,168,280 B1
(45) Date of Patent: Jan. 2, 2001

(54) ILLUMINATION LAMP MOUNTING STRUCTURE FOR USE IN MEASURING INSTRUMENT

(75) Inventor: Masaharu Ozawa, Saitama (JP)

(73) Assignee: Kansei Corporation, Saitama (JP)

( * ) Notice: Under 35 U.S.C. 154(b), the term of this patent shall be extended for 0 days.

(21) Appl. No.: 09/299,654

(22) Filed: Apr. 27, 1999

(30) Foreign Application Priority Data

Apr. 28, 1998 (JP) .................................................. 10-119157

(51) Int. Cl.[7] .................................................. G01D 11/28
(52) U.S. Cl. .............................. 362/23; 362/28; 362/29; 362/30; 362/85
(58) Field of Search .................................... 362/23, 28, 29, 362/30, 85

(56) References Cited

U.S. PATENT DOCUMENTS

| | | | |
|---|---|---|---|
| 5,523,922 | * 6/1996 | Kato | 362/23 |
| 5,839,811 | * 11/1998 | Shimura | 362/30 |
| 5,911,492 | * 6/1999 | Perry et al. | 362/30 |
| 6,025,820 | * 2/2000 | Salmon et al. | 345/75 |
| 6,070,549 | * 6/2000 | Iuchi et al. | 362/23 |

FOREIGN PATENT DOCUMENTS 3-115925  5/1991  (JP) .............................. G01D 11/24

* cited by examiner

*Primary Examiner*—Sandra O'Shea
*Assistant Examiner*—Anabel Ton
(74) *Attorney, Agent, or Firm*—Sughrue, Mion, Zinn, Macpeak & Seas, PLLC

(57) ABSTRACT

In an illumination lamp mounting structure for use in a measuring instrument, a lower case 21 includes a front surface opening portion 22 and a rear surface opening portion 23, a movement supporting intermediate wall 24 interposed between the front surface opening portion 22 and rear surface opening portion 23 of the lower case 21 is formed integrally with a light source supporting intermediate wall 25 which is situated nearer to the front surface opening portion 22 than is the movement supporting surface of the movement supporting intermediate wall 24. and on the light source supporting intermediate wall 25, there is supported an illumination lamp 32 which is used to illuminate the display plate 33 transmissively.

5 Claims, 3 Drawing Sheets

ILLUMINATION LAMP MOUNTING STRUCTURE FOR USE IN MEASURING INSTRUMENT

BACKGROUND OF THE INVENTION

1. Field of the Invention

The present invention relates to an illumination lamp mounting structure to be equipped in the interior portion of a measuring instrument on board a car or the like and, in particular, to an illumination lamp mounting structure for use in a measuring instrument, in which the light from an illumination lamp equipped in the interior portion of a measuring instrument is allowed to illuminate a display plate efficiently without being blocked off by parts which are mounted in the interior portion of the measuring instrument and could otherwise provide obstacles to the light from the illumination lamp.

2. Description of the Related Art

As a conventional structure of a measuring instrument on board a car which is produced by assembling together a plurality of measuring devices into a single case, for example, there is known a structure which is disclosed in Japanese Patent Unexamined Publication No. Hei 3-115925. Describing the main portions of the conventional structure with reference to FIG. 3, reference character 1 designates a case which is formed of synthetic resin in such a color as having a high light reflection factor. The case 1 includes a front surface opening portion and a rear surface opening portion; on the front surface side of the rear surface opening portion, there are disposed partition walls 2 in such a manner that they are formed integrally with the inner peripheral side portion of the case 1; and, on the front side of the partition walls 2, there is formed a front side storage space 3 and, on the rear side of the partition wall 2, there are formed a plurality of rear side storage spaces 4. In the front surface portions of the partition walls 2, there are formed a plurality of placement surface portions 6 on each of which an electric measuring device 5 such as a measuring device of a cross coil type, and there is provided a cylindrical portion 9 which defines a storage chamber 8 used to store therein a display lamp 7 for illuminating a warning indicator, an A/T indicator and the like; and, in the rear surfaces of the partition walls 2, there are provided a plurality of plate-shaped ribs 10 in such a manner that they project rearwardly, whereby the rear side storage space 4 is divided in two or more parts. Also, on the rear surface of the partition walls 2, correspondingly to the above-mentioned placement surface portions 6, there are provided a plurality of boss portions 12 which respectively project rearwardly and also through which their associated screws 11 for terminals can be inserted. Further, a circuit board 13 is fixed onto the rear surface of the case 1 by mounting screws (not shown) and, to the circuit board 13, there is connected the above-mentioned display lamp 7, illumination lamps 7A, and electronic parts 14 which can be disposed within the rear side storage spaces 4 respectively defined by the partition walls 2.

In FIG. 3, reference numeral 15 designates display plates which are respectively to be situated in the front surface opening portion of the case 1. The display plates 15 are mounted in such a manner that they respectively correspond to the electric measuring devices 5, and they are structured in such a manner that they allow the light from the illumination lamp 7A to pass therethrough and thus can be illuminated by such light. Reference numeral 16 stands for indicators which are mounted on the electric measuring devices respectively. Reference numeral 17 designates a rear surface cover which is used to cover and protect the circuit board 13.

In the conventional measuring instrument having the above-mentioned structure, the respective illumination lamps 7A are supported directly on the surface of the circuit board 13 and are situated between the mutually adjoining boss portions 12 of the partition walls 2 as well as in the valley portions between the boss portions 12 and the wall surface of the case wall or partition walls 2, and, on the placement surface portions 6 which are respectively formed on the upper end portions of the boss portions 12, there are placed the electric measuring devices 5. Therefore, the boss portions 12 and electric measuring devices 5 provide obstacles to the optical paths of the lights that are respectively emitted from the illumination lamps 7A. Because of this, in the respective display plates 15, there are produced the portions that can be illuminated by the lights emitted from the illumination lamps 7A (that is, the portions that can be illuminated transmissively by the lights) and the portions that are not illuminated, which makes it impossible to illuminate the display plates 15 uniformly.

Since the display plates 15 are greatly distant from the illumination lamps 7A, the illumination efficiency of the display plates 15 is poor. Further, because the illumination lamps 7A are supported directly on the circuit board 13, for example, if the positions of the measuring devices 5 are changed in accordance with variations in the design of the measuring instrument, then the positions of the illumination lamps 7A must be changed in linking with the position changes of the measuring devices 5, and thus the design of the circuit board 13, on which the illumination lamps 7A are mounted and supported, must be changed, which increases the manufacturing cost of the circuit board 13 to a great extent.

Further, in recent years, in the circuit board 13 which is used to control a meter, besides parts for controlling the meter, there have been integratedly mounted control circuit parts which are used to control electric equipment such as a keyless entry system and the like, so that the meter circuit board 13 becomes highly dense, which makes it difficult to ensure the illumination lamps 7A.

SUMMARY OF THE INVENTION

The present invention has been made to eliminate the drawbacks with the above-mentioned conventional measuring instrument.

Accordingly, one object of the invention is to provide an illumination lamp mounting structure for use in an analog-type measuring instrument in which a light source is positioned in such a manner that not only the transmissive illumination of a display plate forming the measuring instrument can be distributed uniformly over the whole surface of the display plate, but also the illumination efficiency of the display plate can be enhanced.

Another object of the invention is to provide an illumination lamp mounting structure for use in a measuring instrument in which, even if the design of the measuring instrument is changed, at least a printed circuit board can be used in common as it is without changing the design thereof to thereby enhance the economic efficiency of the manufacture of the measuring instrument.

Still another object of the invention is to relax the highly dense state of the circuit board.

To achieve the above objects, according to a first aspect of the invention, there is provided an illumination lamp mounting structure for use in a measuring instrument comprising:

a lower case for storing therein a measuring instrument movement, said lower case including a front surface opening portion and a rear surface opening portion;

a display lamp for illuminating a warning indicator;

an illumination lamp for illuminating a display plate;

an upper case connected to and held by the front edge of the lower case;

a front surface cover mounted on the opening edge of the upper case;

a circuit board mounted on and held by the rear edge of the lower case;

a movement supporting intermediate wall interposed between the front surface opening portion and rear surface opening portion of the lower case;

a light source supporting intermediate wall situated nearer to a direction of the front surface opening portion that the movement supporting surface of the movement supportinng intermediate wall, said light source supporting intermediate wall being formed integrally with the movement supporting intermediate wall; and an illumination lamp supported on the light source supporting intermediate wall, for transmissively illuminating the display plate.

According to a second aspect of the invention, there is provided an illumination lamp mounting structure for use in a measuring instrument as set forth in the first aspect of the invention, further comprising: a light diffusion plate, which is superimposed on the back surface of the display plate, interposed between the display plate and illumination lamp, for allowing the light from the illumination lamp to pass through the light diffusion plate to illuminate the display plate transmissively.

DETAILED DESCRIPTION OF THE PREFERRED EMBODIMENT

Figure 1:
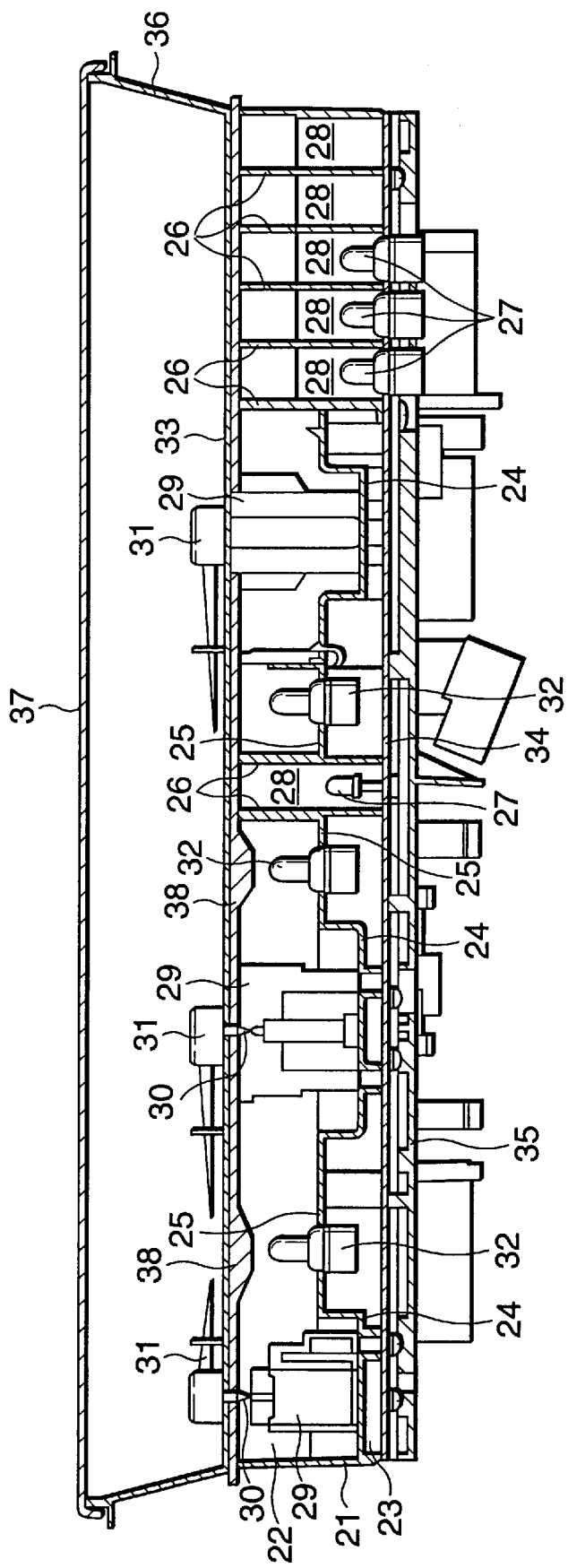
FIG. 1 is a transverse section view of an embodiment of a measuring instrument incorporating therein an illumination lamp mounting structure according to the invention.
Figure 2:
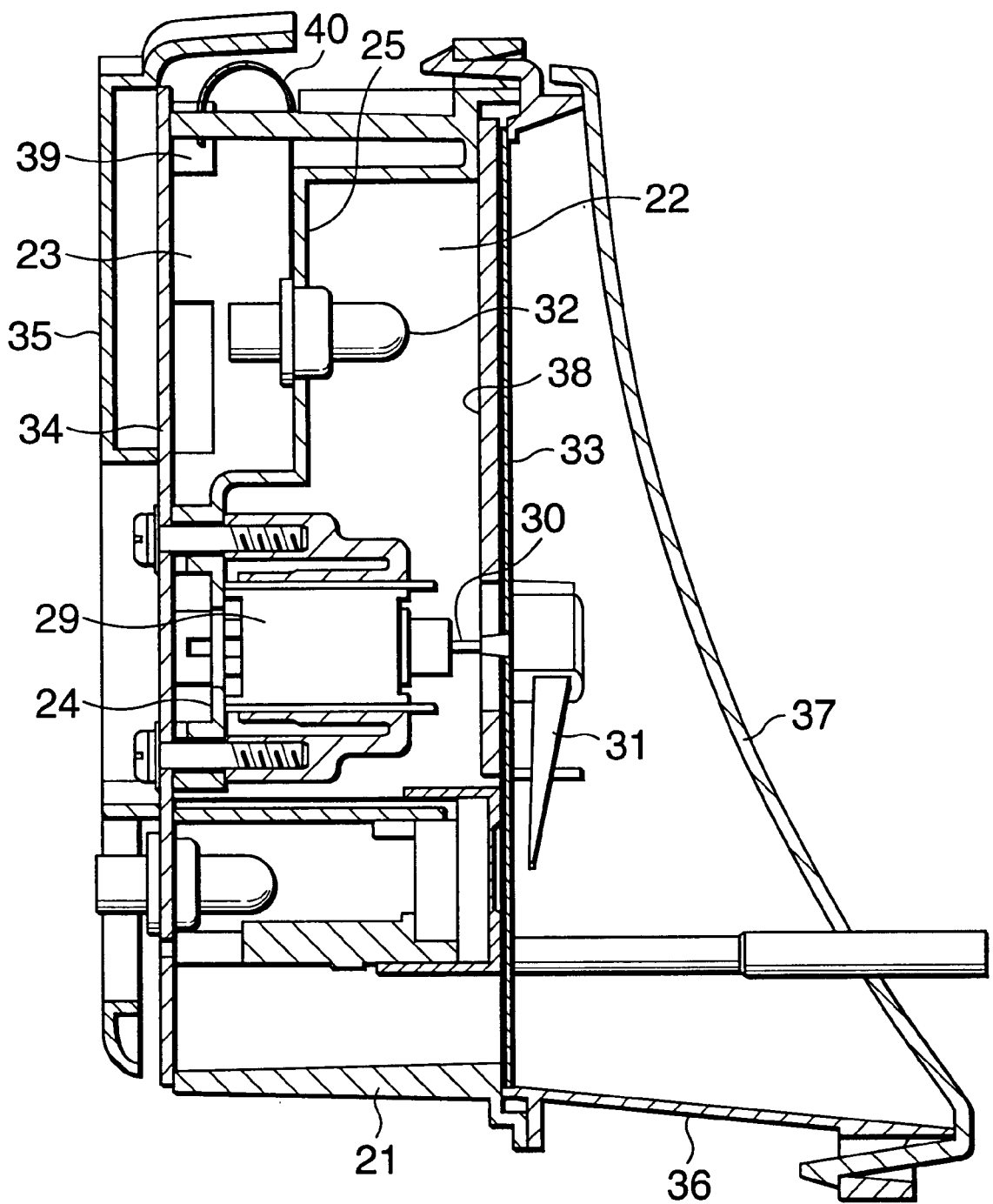
FIG. 2 is a longitudinal section view of an embodiment of a measuring instrument incorporating therein an illumination lamp mounting structure according to the invention.
Figure 3:
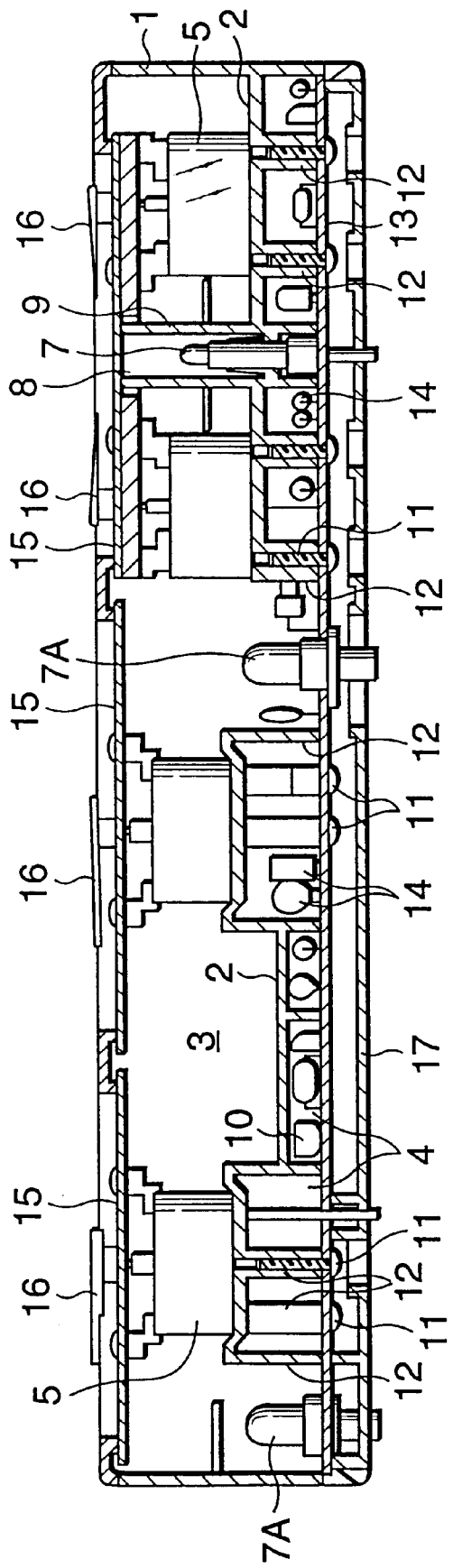
FIG. 3 is an explanatory section view of a conventional measuring instrument.

Now, a description will be given below in more detail of an illumination lamp mounting structure for use in a measuring instrument according to an embodiment of the invention with reference to FIGS. 1 and 2.

In the drawings, reference numeral 21 designates a lower case which is formed of synthetic resin. The lower case 21 includes a front surface opening portion 22 and a rear surface opening portion 23. In the interior portion of the lower case 21, between the front surface opening portion 22 and rear surface opening portion 23, there are formed movement supporting intermediate walls 24 and light source supporting intermediate walls 25. The movement supporting intermediate wall 24 is formed adjacently to the rear surface opening portion 23, while the forming position of the movement supporting intermediate wall 24 depends on the size of a movement (which will be discussed later) to be mounted within the lower case 21. On the other hand, the light source supporting intermediate wall 25 is positioned and formed nearer to the front surface opening portion 22 than the forming position of the movement supporting intermediate wall 24. Also, at the proper positions of the lower case 21, there are formed a plurality of partition walls 26 in such a manner that they extend between the front surface opening portion 22 and rear surface opening portion 23; and, these partition walls 26 form a plurality of display lamp storage chambers 28 for storing therein display lamps 27 such as warning lamps and the like.

Reference numeral 29 designates measuring instrument movements (measuring instrument main bodies) which are respectively fixed to and supported by the movement supporting intermediate walls 24. The measuring instrument movements 29 respectively include pointer shafts 30 in such a manner that the pointer shafts 30 are projected from their associated measuring instrument movements 29 and, on the pointer shafts 30, there are mounted pointers 31 respectively. Also, 32 stands for illumination lamps which are respectively supported by the light source supporting intermediate walls 25; and, if the illumination lamps 32 are turned on, then a display plate 33 displaying the indication values that are indicated by the pointers 31 can be illuminated by the lights that are emitted from the illumination lamps 32 and transmitted through the display plate 33.

A flexible printed-circuit board 40 is attached to the wall surface of the light source supporting intermediate wall 25 on the rear surface opening portion 23 side thereof, while the end portion of the flexible printed-circuit board 40 is connected to a flexible printed-circuit board connector 39 which is disposed on a circuit board 34, whereby power is supplied from the circuit board 34 to the illumination lamp 32 through the flexible printed-circuit board 40. By the way, in the present embodiment, on the back surface of the display plate 33, there is superimposed a light diffusion plate 38 which is used to illuminate the whole surface of the display plate 33.

The display plate 33 is mounted on the lower case 21 in such a manner as to close the front surface opening portion 22 of the lower case 21 and, on the rear surface opening portion 23 of the lower case 21, the circuit board 34 is mounted in such a manner that it closes the rear surface opening portion 23, while the display lamps 27 are respectively supported by and connected to the present circuit board 34. Reference character 35 designates a rear surface cover which is used to protect the rear surface of the circuit board 34 mounted on the rear surface opening portion 23 of the lower case 21, and 36 stands for an upper case mounted on the front surface opening portion 22 of the lower case 21, while a transparent front surface cover 37 is mounted on the upper case 36.

Subsequently, a description will be given below of the operation of the above-structured embodiment. In the interior portion of the lower case 21 which forms the measuring instrument, there are disposed mechanical devices such as the measuring instrument movements, display lamps 27 used to display warnings or the like, and illumination lamps 32 which are used to transmit their respective lights through the display plate 33 to thereby illuminate the display plate 33. Especially, the present embodiment is characterized in that the illumination lamps 32 used to transmissively illuminate the display plate 33 are respectively supported by the light source supporting intermediate walls 25 formed in the interior portion of the lower case 21, and also in that the forming positions of the light source supporting intermediate walls 25 are shifted nearer to the front surface opening portion 22 of the lower case 2 than the forming positions of the movement supporting intermediate walls 24 used to support the measuring instrument movements 29.

That is, since the illumination lamps 32 are supported by the light source supporting intermediate walls 25, the illumination lamps 32 can be made to approach the back surface of the display plate 33, thereby being able to avoid the inconvenience that part of the lights radiated from the illumination lamps 32 can be blocked off by part of the mechanical devices such as the measuring instrument movements 29 and the like. Due to this, the lights emitted from the illumination lamps 32 can be radiated onto the display plate 33 effectively, thereby being able to illuminate the whole area of the display plate 33 uniformly.

In the present embodiment, because the illumination lamps 32 are positioned near the back surface of the display plate 33, the illumination efficiency of the display plate 33 by the illumination lamps 32 can be enhanced, which makes it possible to enhance the illumination luminance of the display plate 33 without increasing the wattage of the illumination lamps 32.

Further, in the present embodiment, the illumination lamps 32, which are respectively used to illuminate transmissively the display plate 33 fixed to the lower case 21, are supported on and by the light source supporting intermediate walls 25 which are respectively disposed in and formed integrally with the interior portion of the lower case 21, so that the mounting positions (supporting positions) of the illumination lamps 32 corresponding to the display plate 33 are free from the circuit board 34. Thanks to this, even when the mounting positions, design or the like of the respective measuring instrument movements 29 in the measuring instrument are changed, the circuit board 34, as it is, can be used in common without changing the design thereof, which not only can enhance the economic efficiency of the circuit board 34 used but also can relax the highly dense state of the circuit board 13.

As has been described heretofore, according to the illumination lamp mounting structure for use in a measuring instrument constructed in accordance with the invention, the whole area of the display plate of an analog-type measuring instrument can be transmissively illuminated evenly and uniformly. Also, since the luminance of the display plate can be enhanced without raising the output of the illumination lamps, the power consumption of the present illumination lamp mounting structure can be saved and thus the calorific value thereof can be controlled. Further, since there is no need to change the design of the circuit board even when the design and the like of the measuring instrument are changed, common use of the circuit board is possible and thus the economic efficiency of the circuit board used can be enhanced greatly.

What is claimed is:

1. An illumination lamp mounting structure for use in a measuring instrument, comprising:
    a lower case for storing a measuring-instrument movement, said lower case including a front-surface opening portion and a rear-surface opening portion;
    a display plate disposed over said front-surface opening portion;
    a first intermediate wall, interposed between the front-surface opening portion and rear-surface opening portion of said lower case, having a supporting surface adapted to support the measuring-instrument movement;
    a second intermediate wall situated nearer to the front-surface opening portion than is the supporting surface of said first intermediate wall, said second intermediate wall being formed integrally with said first intermediate wall; and
    an illumination lamp supported on said second intermediate wall and being disposed so as transmissively to illuminate the display plate, wherein said illumination lamp is disposed on the same side of said display plate as is said first intermediate wall.

2. An illumination lamp mounting structure as claimed in claim 1, further comprising: a light diffusion plate, which is superimposed on the back surface of the display plate, interposed between said display plate and said illumination lamp, for allowing the light from said illumination lamp to pass through said light diffusion plate to illuminate said display plate transmissively.

3. An illumination lamp mounting structure according to claim 1, further comprising:
    a display lamp for illuminating a warning indicator;
    an upper case connected to and held by a front edge of said lower case;
    a front surface cover mounted on an open edge of said upper case; and
    a circuit board mounted on and held by a rear edge of said lower case.

4. An illumination lamp mounting structure according to claim 1, wherein said first intermediate wall is monolithically formed with said second intermediate wall.

5. An illumination lamp mounting structure according to claim 3, wherein said illumination lamp is not disposed on said circuit board.

* * * * *